United States Patent
Tolle et al.

[15] 3,653,359
[45] Apr. 4, 1972

[54] METHOD AND APPARATUS FOR MILKING DAIRY ANIMALS BY MEANS OF A CATHETER

[72] Inventors: Adolf Tolle, Kiel-Kitzeberg, Drosseleck 4; Hans Zeidler, Post Raisdorf, Schlesweg-Holstein, Schadtbeck, both of Germany

[22] Filed: Mar. 9, 1970

[21] Appl. No.: 17,696

[30] Foreign Application Priority Data

Mar. 12, 1969 Germany ................P 19 12 585.0

[52] U.S. Cl. ..................119/14.02, 119/14.19, 119/14.2
[51] Int. Cl. ...............................................A01j 03/00
[58] Field of Search ............119/14.02, 14.19, 14.2, 14.21, 119/14.01; 128/348

[56] References Cited
UNITED STATES PATENTS

| | | | |
|---|---|---|---|
| 3,294,063 | 12/1966 | Brodrick | 119/14.02 |
| 3,540,451 | 11/1970 | Zeman | 128/348 X |
| 520,398 | 5/1894 | Pelton | 119/14.2 |
| 1,116,379 | 11/1914 | Browning | 119/14.2 |

*Primary Examiner*—Hugh R. Chamblee
*Attorney*—Flynn & Frishauf

[57] ABSTRACT

To provide for germ-free milk removal, a suction element, introduced into the udder of a dairy animal is connected to a catheter which is carried beneath the skin of the animal to a point conveniently accessible for germ-free connection of milking apparatus, such as, for example, near the knee of one of the legs of the animal. The suction element may be an open, perforated tube, ball-shaped or the like, and the catheter secured thereto. The exit wound is closed off by means of a collar or sleeve, which may be perforated to promote tissue regrowth and effective sealing of regrown skin.

24 Claims, 15 Drawing Figures

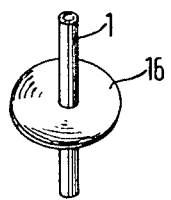
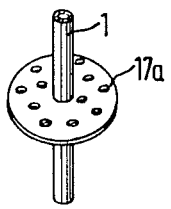
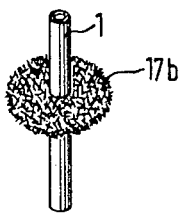
Fig. 6　　Fig. 7　　Fig. 8
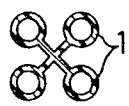
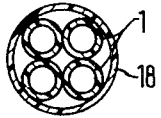
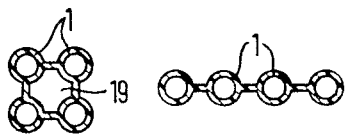
Fig. 9　　Fig. 10　　Fig. 11　　Fig. 12
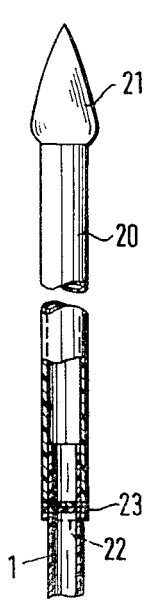
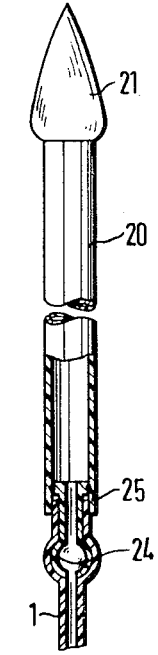
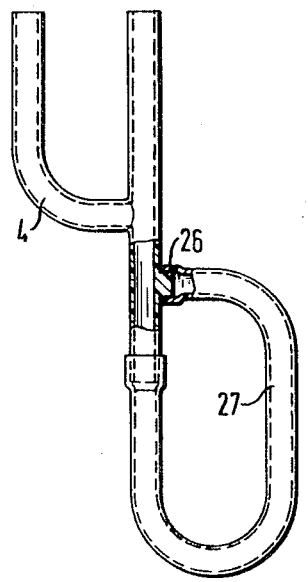
Fig. 14　　Fig. 15　　Fig. 13

METHOD AND APPARATUS FOR MILKING DAIRY ANIMALS BY MEANS OF A CATHETER

The invention relates to a method and apparatus for milking dairy animals by means of a milk receiving element remaining in the teat and connected to a catheter. The milk conducting and collecting devices connected to the catheter may be connected permanently or only for each milking operation.

Methods of milking by means of catheters have long which have prevented their use in practice. Apart from the use of "-milking tubes" for hand milking, which, since they were generally removed after each milking operation, often damaged the teat canal and the fragile mucous membranes and introduced infections, there were methods in which a catheter was connected directly to a milk line leading to the milk collecting container and possibly co-operated with a suction cup pushed onto the teat, connected to a vacuum. In the latter case, the milk may become aerated, which is undesirable. Also, in the case of conventional catheter milking systems it is necessary to take special, often complicated and troublesome precautions to prevent the catheter from sliding out of the teat canal. The thickened portion of the catheter which is adapted to lie behind the sphincter after insertion of the catheter cannot be certain to fulfil this function. Since the teat canal does not always close tightly, the use of a catheter milking method does not reliably prevent infection of the mammary glands or the introduction of germs into the milk which is obtained. In particular, also, the fit and cleanliness of the catheter and of the tubes connected to it are endangered because the animal may kick them with its rear legs and hooves, pulling them out or making them dirty.

For all these reasons, and especially the much greater risk of disease, particularly mastitis, catheter milking methods have not proved effective in practice and have not found favour. On the contrary, all the milking methods at present in use are based on the principle of the two-chamber milking cup, i.e. a pulsator is connected to the apparatus and alternating rest strokes with suction strokes during which milk flows out of the teat, to reduce pressure on the teat and promote the blood circulation.

Even these modern milking methods have a number of substantial disadvantages. For example, the milk is necessarily contaminated by microorganisms during milking, and this contamination of the milk must be kept within acceptable limits by means of complicated processes and apparatus. Also, the problem of mastitis is not solved by the introduction of machine milking. There is at least as much udder disease in farms using machine milking as in farms using hand milking.

Lastly, these milking methods require expensive and complicated systems which, while reducing the physical labor need considerable maintenance and experienced and conscientious operators.

It is an object of the invention to obviate these disadvantages of known milking methods and to provide a milking method and apparatus in which, though the catheter remains in the teat, infection of the udder and contamination of the milk is avoided.

SUBJECT MATTER OF THE INVENTION

A suction piece is implanted within the milk duct of the udder and connected to a catheter. The suction piece and tube remain in the animal. The catheter tube is carried in the animal within the body of the animal, beneath its skin, to a point anatomically, and mechanically suitable for bringing it out from beneath the skin of the animal, for example the hock region. After each milking, the end of the catheter tube is closed in a sterile manner.

The outer end of the catheter is arranged to permit disinfection thereof (as well as of any collecting vessels used and milk storage containers connected thereto). The catheter as well as the suction element are kept permanently sterile, even in the case of intermittent milking. Infections of the mammary glands are prevented and the milk obtained cannot be contaminated with germs introduced from outside. The run of the catheter beneath the skin to a suitable exit has the additional advantage that the exit can be away from the area accessible to the animal by its own legs and to a site which is easily cleaned and maintained clean, so that both efficiency and hygiene are greatly improved. Difficulties due to the catheter slipping out are avoided. The outer end of the catheter can be conveniently fixed to the skin of the animal. The exit for the catheter tube through the skin may advantageously be sealed by means of a collar or the like secured to the catheter tube and is either adhered to skin from outside (after suitable preparation) or pushed beneath the skin, thus preventing infectious organisms and germs from entering along the catheter tube. If the collar is to be sited beneath the skin, it edges preferably consist of fleece-like material or are perforated so that tissue may grow through. If the natural teat canal does not close sufficiently tightly, it can be closed artifically, since the milk is in any case discharged through the catheter.

According to a feature of the invention, a milk line leads to the milk collecting container which advantageously has a feed pump or is connected to a vacuum line. The catheter consists of a flexible catheter tube of biologically inert material, having a suction element of soft resilient, biologically inert material at its inner end. A shut-off means is provided at its outer end, which may be connected to a collection manifold, for connection to a plurality of catheters. A detachable closure may be at the outer end of the system.

The flexible catheter tube and/or the soft resilient suction element may be made from a suitable synthetic plastic material, rubber or even metal. Suitable synthetic plastic materials are, for example, polyfluorohydrocarbons, polyethylene and, in particular silicone rubber. Possible metals are stainless steel or other biologically inert metals. The suction element must be very resilient to prevent damage to the milk ducts, cistern and teat and to ensure that the opening is always wide enough for the milk to enter. More particularly, it may be in the form of a length of hose, a rose or a cage, the length of hose being open at least at the top. Before being inserted in the milk cistern, the suction element may be folded or compressed, to open out when in position. Advantageously, if it is in the form of a length of tubing, its wall is perforated with holes or slots so that the milk can enter easily.

Preferably, the catheter tube enters the suction element in such a way that the axis of the catheter tube forms an upwardly open acute angle with the axis of the suction element. This arrangement effectively holds the suction element in desired position in the milk cistern and prevents it from being drawn into the glandular tissue. Advantageously, the outer end of the catheter tube bears a sleeve, collar or the like, securely or integrally connected thereto and providing an effective seal, against any infectious organisms entering by way of the outside of the catheter tube. This collar may be smooth so that it can be adhered to the skin and particularly if in form of a sleeve, and to be inserted directly beneath the skin, it may be made from fleece-like or other textile, woven material or contain holes, so that tissue can grow through.

The catheter tube, or the collecting line leading from the manifold may contain a hose portion which acts as shut-off means or as an additional shut-off element, collapsing if a negative pressure prevails in the catheter tube or manifold hose by pressure of the higher, atmospheric pressure acting thereon from outside. Thus any vacuum prevailing in the milk line is sealed off and attraction of the mucous membrane onto the suction element is automatically prevented.

Advantageously, the catheter tube is drawn from the milk cistern to the exit through the skin, or vice versa, by means of a trocar or the like.

The invention will be described by way of example with reference to the accompanying drawings, wherein:

FIGS. 6 to 8 show different embodiments of catheter collars;

FIGS. 9 to 12 show different embodiments of quadruple catheters in cross section;

FIG. 13 shows a manifold with a closure valve;

FIG. 14 shows one embodiment of the rod-like catheter inserting instrument, in longitudinal section; and FIG. 15 shows another embodiment of the instrument seen in FIG. 14.

Figure 1:
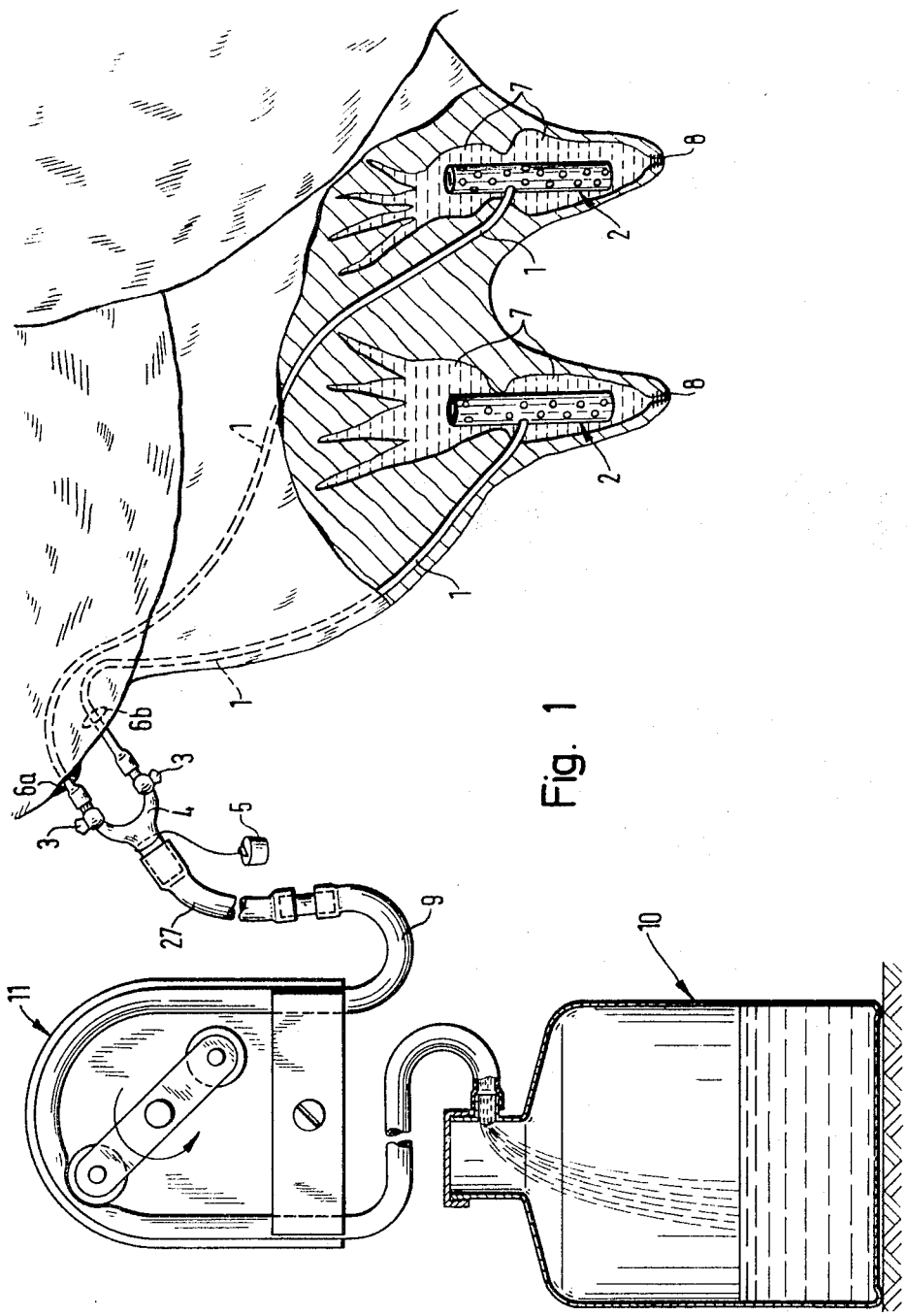
FIG. 1 is a diagrammatic view of the milking apparatus as a whole.

As FIG. 1 shows, a soft resilient suction element 2, which is connected to a catheter tube 1, is inserted in the milk cistern 7 of the animal. Insertion may be by way of the natural teat canal 8 or by means of an operation carried out on the side wall of the teat. In the embodiment shown, the catheter tube 1 runs beneath the skin of the udder to a site near the knee fold on the inside of the rear leg, that is, near the hock, where the skin is perforated. Alternatively, insertion may be in the reverse direction, from this site to the milk cistern, advantageously be means of a trocar, or a rod-like inserting instrument described below with reference to FIGS. 14 and 15.

The suction element 2 must be of soft, flexible, elastic resilient material, to prevent injury and yet to always maintain an opening for the entry of the milk. The catheter tube 1 must be flexible and also somewhat resilient. For both elements, therefore, synthetic plastics, for example a silicone rubber, are particularly suitable materials. If appropriate, however, the catheter tube and suction element or parts of them could be made from biologically inert metal, such as stainless steel. In the embodiment illustrated, the suction element 2 is a length of tubing which is open at both ends and has holes in its walls; the catheter tube 1 enters the suction element at an acute angle. As a result, the suction element sits well in the milk cistern and there is no risk of the main openings becoming blocked, since the suction element is always flushed longitudinally. A collar 6a or 6b on the catheter tube, in front of the outer end of this tube, tightly embraces the tube and is preferably integral with it. This collar is either smooth and continuous (6a) and preferably supplied with an adhesive layer, so that it can be stuck to the skin from outside, or fleece-like or perforated (6b), so that it can be inserted just beneath the skin and tissue can grow through it. In either case, such a collar, or a sleeve, or similar seal provides an effective barrier against any infectious organisms or germs penetrating along the outside wall of the catheter from outside.

A manifold 4, for example of glass, metal or synthetic plastic material, is connected to the outer end of the catheter tube 1. This manifold generally has as many connections as catheter tubes running from the four milk cisterns are provided, for example four, though only two connections are shown diagrammatically in the Figure. Each catheter tube is provided with shut-off means 3, for example a hose clamp or roll clamp, or a length of tubing which can collapse under atmospheric pressure, when a negative pressure prevails therein so that it can be shut off independently of the other catheter tubes. Alternatively, a similar common shut-off device might be provided on that portion of the manifold leading from the manifold to the milk line 9. This outward-leading end of the manifold may be closed with a cap 5 after removal of the milk line 9, after disinfectant material, for example a disinfectant solution or a wad of cotton wool impregnated with such a solution, has been inserted in the outlet tube of the manifold. The space between the shut-off means for the catheter tubes or manifold and the outer end of the manifold is therefore kept sterile. If there is no manifold, the ends of the catheter tubes are closed with similar caps 5 after disinfectant substances have been suitably inserted in the ends of the catheter tubes, so that the space as far as the shut-off means is kept sterile until the sterilized milk line is reconnected.

Instead of a separate plug 5, a valve and spigot 26 (FIG. 13) rigidly attached to the manifold itself may be used, the end of a short connecting tube 27 leading from the manifold to the milk line, when milking, being pushed onto the spigot in order to close this end when not in use. The manifold and the catheter tubes connected thereto can therefore be securely sealed once disinfectant has been inserted in the length 27 of the tubing.

Whenever the milk is discharged, it flows, due to gravity, along the catheter tube into the milk collecting container 10 (FIG. 1), which is sterile, sterilized or lined with sterile synthetic plastics film. The discharge of the milk may be accelerated and made more uniform, however, by means of a feed pump, for example a peristaltic pump 11, provided in the milk line 9. Alternatively, the milk may be discharged in a known manner by applying a vacuum to the milk collecting container 10, so that a plurality of dairy animals can be connected to the same milk line.

Figure 2:
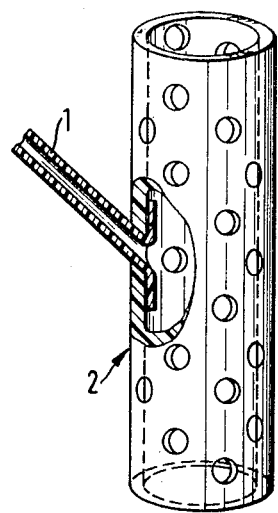
FIG. 2 shows the suction element from FIG. 1.

FIG. 2 shows the suction element from FIG. 1 at a larger scale. The catheter tube 1 is passed through the wall of the tubular suction element 2 into the cavity inside this element and attached to its inside surface, where, for example, it is adhered or is held by its end, which is bent back to form a collar. It is located such that its opening will remain clear. If desired, the suction element and catheter tube may be made in one piece. The suction element 2, for example, may be made from silicone rubber hose with an internal diameter of 6 mm. and a wall thickness of 1.5 mm. The hose may be longer initially, for example 20 cm. long, and be cut before insertion, for example to 12 cm., to fit the teat concerned. The catheter tube may, for example, have an external diameter of 4 mm. and an internal diameter of 2.3 mm.

Figure 3:
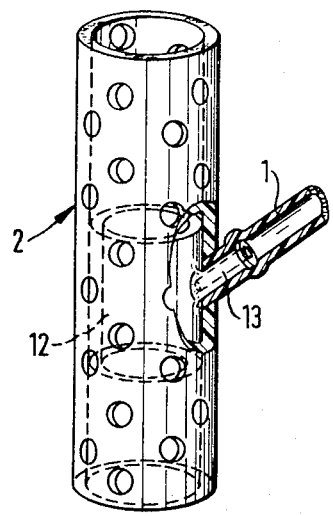
FIG. 3 shows a different embodiment of suction element.

FIG. 3 shows a different embodiment of the suction element, with the same basic shape as that in FIG. 2 but containing a tubular element 12 which is made of fairly rigid material and is shorter than the suction element. This tubular element 12 has a tubular spigot 13, which leads into its interior and passes through the wall of the suction element, and on which the end of the catheter tube can be fixed. This arrangement assures a clear suction space around the catheter.

Figure 4:
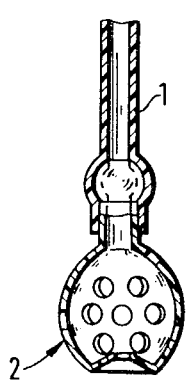
FIG. 4 shows a further embodiment of the suction element.

Alternatively, as FIG. 4 shows, the suction element may be in the form of a hollow spherical or pear-shaped rose. If so, however, it must have at least one recess containing an opening which cannot be closed by the mucous membrane.

Figure 5:
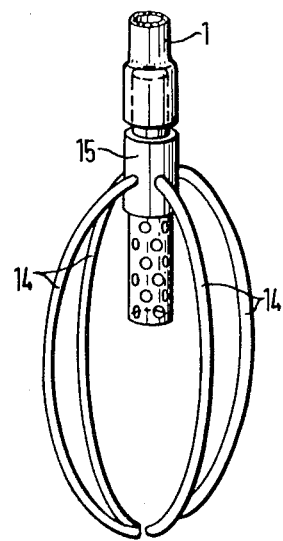
FIG. 5 shows a further, cage-like embodiment of suction element.

FIG. 5 illustrates a cage-like form of suction element, made from a plurality of bent, rod-like resilient elements 14 which abut or are connected at their lower ends and whose other ends are joined to a spigot 15, which the catheter tube can be attached to or passed through. This spigot may extend into the cavity formed between the elements 14.

FIG. 6 shows diagrammatically a collar 16, which is provided at the outer end of the catheter tube and is joined tightly and rigidly thereto, or is integral therewith. This collar can be adhered to the skin to seal the exit for the catheter tube.

FIGS. 7 and 8 show other embodiments of a seal for the catheter. A collar (17a) having holes is shown in FIG. 7. A collar 17b having fleece-like material at least at the edge is shown in FIG. 8. When these seals lie directly beneath the skin, the tissue can grow therethrough, again ensuring a good seal and preventing infectious organisms from entering.

FIGS. 9 to 12 illustrate diagrammatically cross sections through multiple catheters. The space 19 which is outside the catheter tubes but enclosed by the assembly (FIG. 11) or beneath the sheath 18 (FIG. 10), or the space surrounding the catheter tubes and their connecting strips may by empty, or filled with flexible material.

FIG. 14 illustrates a rod-like catheter inserting instrument having a rigid tubular body 20, a closed, lancet-shaped, angular tip 21 and an open end 22, into which the end of the catheter tube 1 can be inserted and in which it can be securely attached by compressing the tubular body at least at site 23 with pliers.

FIG. 15 shows another rod-like catheter inserting instrument, the rigid, rod-like body being solid or tubular and having at one end an olive-shaped bulging portion 24, which is situated in a tubular end portion 25 of the instrument so that one end of the catheter tube 1, when pushed over the olive-shaped portion, is surrounded by the tubular end portion and therefore prevented from slipping down when the instrument is in use.

The quality of the milk which is obtained by means of the method and apparatus according to the invention is high. Contamination of the milk by germs is minimised and largely prevented. Large quantities of sterile milk or milk with a low bacteria content cannot be obtained by any of the other methods known at present. The system makes it possible to obtain milk having maximum storage life and retaining its high-grade nutrient properties. For example, bacterial decomposition does not occur in milk obtained by means of the invention, even when kept for some weeks in an incubator at 30° C, but did occur in an artificially contaminated control sample.

The method and apparatus according to the invention also have substantial advantages as regards operational efficiency. The method permits the milk to be obtained in a particularly simple manner. The physical labour required of the operators for this purpose is minimized. A particular advantage as regards efficiency is the possibility of systematic and largely automatic milking, the harmful influences acting on the animal during milking being largely removed. Any unskilled personnel handling the animals will not detrimentally affect the output of the dairy animals and quality of the milk. Because the milk obtained is sterile or very low in bacteria, it can be stored longer at the producing and processing farm, in a manner which is particularly advantageous from the economical, cost-reduction point of view, also reducing costs for cooling the milk.

Since the milk is drawn out in a particularly gentle manner, it is possible to avoid inflammatory conditions due to irritation of the mammary glands, and the resulting reduction in milk output. Also, the method prevents hygienically undesirable contamination with foreign substances and with inhibiting substances which have harmful effects in dairying operations. By means of the catheter milking method according to the invention, cell counts of around 100 000 cells per ml. and less were obtained over long periods. 500 000 cells per ml. of milk were previously regarded as the lower limit of the norm.

We claim:

1. Method of milking dairy animals by means of a catheter in the udder or teat, connected to a milking and milk collection system comprising
    introducing a milk collection element into a closed milk duct of an animal, said milk collection element having a catheter tube connected thereto;
    placing said catheter tube within the body of the animal beneath the skin thereof to extend from the milk collection element in the udder to an anatomically desirable externally accessible region of the animal remote from the teats and further extending said catheter tube beyond and outside of the animal from said region;
    and forming a connection from the extending end of the catheter tube to the milking system.

2. Method according to claim 1 wherein said milk collection element is introduced into the milk duct in folded, collapsed state.

3. Method according to claim 1 wherein said milk collection element is introduced through the teat of the animal.

4. Method according to claim 1 wherein said anatomically desirable region is situated at the lower part of the trunk of the animal near the hind legs thereof.

5. Milking apparatus adapted to be introduced into the body of a dairy animal comprising
    a milk collection element (2) adapted to be introduced into a closed milk duct of the animal, said milk collection element being made of physiologically inert material;
    a catheter tube (1) interconnected with said milk collection element and of sufficient length to reach from the udder of the animal to and beyond a zone adjacent an externally accessible, anatomically desirable region of the animal, said catheter tube being made of physiologically inert material, and adapted to be located within the body of the animal, to exit therefrom, in an anatomically desirable region of the trunk thereof remote from the teat;
    means secured to said tube and adapted to seal said tube to the tissue of the animal at the exit of the catheter tube from within the skin of the animal, and adapted for connection to a milk collecting apparatus.

6. Apparatus according to claim 5 wherein the catheter tube and the milk collection element are unitary.

7. Apparatus according to claim 5 including a collection manifold (4) connected to a plurality of catheter tubes;
    and means closing off the outlet from said manifold.

8. Apparatus according to claim 5 wherein the milk collection element comprises an open tube; and said catheter tube is connected to the side wall of said open tube at a point intermediate its length.

9. Apparatus according to claim 8, wherein the axis of a catheter tube at a junction with said open milk collection element tube forms an acute angle with the axis of the milk collection element tube.

10. Apparatus according to claim 8, wherein the sidewalls of the tube of the milk collection element are perforated.

11. Apparatus as claimed in claim 8 wherein the milk collection element (FIG. 3) is in the form of a tubular member which is open at least at its upper end, and has the side walls formed with slots or holes extending therethrough;
    a tubular element (12) which is of more rigid material than the material of the tubular member is located inside said tubular member, the tubular element being shorter than the tubular member; and
    a tubular spigot (13) is connected to the tubular element, communicating with the interior of the tubular element (12) and extending through the wall of the tubular member, the inner end of the catheter tube (1) being attached to the tubular spigot (13), so that there is a connection to the interior of the tubular member of the milk collection element.

12. Apparatus as claimed in claim 5 wherein the milk collection element (FIG. 4) is in the form of a hollow ball or pear-shaped element, having a perforate wall including an enlarged suction opening therein and an olive-shaped bulge forming a spigot opposite said enlarged opening for attaching the catheter tube.

13. Apparatus as claimed in claim 5 wherein the milk collection element (FIG. 5) comprises a cage formed of a plurality of curved rod-like elements (14) abutting or joined at their lower ends and connected at their other ends to a spigot (15) which may extend into the cavity formed between these elements, the catheter tube being attached to said spigot.

14. Apparatus as claimed in claim 5 wherein said means sealing said tube to the animal comprises a sealing collar (16, 17) secured to said catheter near the other end.

15. Apparatus as claimed in claim 14 wherein the side of the collar (16) nearer the body of the animal carries a layer of adhesive so that it can be adhered to the skin of the animal.

16. Apparatus as claimed in claim 14 wherein the collar (17) is made from biologically inert, fleece-like or knitted material or contains holes, through which, when the collar is inserted beneath the skin, tissue can grow.

17. Apparatus as claimed in claim 5 including a manifold situated outside the body of the animal and having an integral stopper-like element (26) onto which the tube end of the manifold can be placed when removed from the milk line.

18. Apparatus as claimed in claim 5 including a shut-off element connected to the catheter tube and located outside the body of the animal, the shut-off element being of a material capable of collapsing if a negative pressure prevails in the catheter tube due to atmospheric pressure acting on the shut-off element from the outside.

19. Apparatus as claimed in claim 5 wherein a plurality of catheter tubes in the form of a multiple tube array, are provided and connected to a plurality of suction elements, the tubes of said array being interconnected.

20. Apparatus as claimed in claim 19 wherein the catheter tube array comprises a double tube array.

21. Apparatus as claimed in claim 19 wherein the catheter tube array comprises a quadruple tube array.

22. Apparatus according to claim 5 wherein said anatomically desirable region is situated near the skin fold extending from the hock of the animal to the trunk thereof.

23. Apparatus as claimed in claim 5 wherein the milk collection element (2) comprises resiliently deformable material.

24. Apparatus as claimed in claim 5, wherein the means secured to the tube adapted to seal the tube to the tissue of the animal are adapted to seal said tube to the skin of the animal.

* * * * *